US011822442B2

(12) United States Patent
Kulkarni et al.

(10) Patent No.: US 11,822,442 B2
(45) Date of Patent: Nov. 21, 2023

(54) ACTIVE-STANDBY PODS IN A CONTAINER ORCHESTRATION ENVIRONMENT

(71) Applicant: Avaya Management L.P., Durham, NC (US)

(72) Inventors: Prasanna Mahadeo Kulkarni, Pune (IN); Amit Mishra, Broomfield, CO (US); Nayana Teja Avatapalli, Andhra Pradesh (IN)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/337,501

(22) Filed: Jun. 3, 2021

(65) Prior Publication Data
US 2022/0391294 A1    Dec. 8, 2022

(51) Int. Cl.
*G06F 11/07* (2006.01)
*G06F 11/20* (2006.01)
*G06F 9/54* (2006.01)

(52) U.S. Cl.
CPC ........... *G06F 11/2025* (2013.01); *G06F 9/54* (2013.01); *G06F 2201/85* (2013.01)

(58) Field of Classification Search
CPC ..... G06F 11/2025; G06F 9/54; G06F 2201/85
See application file for complete search history.

(56) References Cited

U.S. PATENT DOCUMENTS

2021/0036951 A1* 2/2021 Heron .................... H04L 45/34
2021/0406035 A1* 12/2021 Price .................... G06F 11/3055

OTHER PUBLICATIONS

L. Abdollahi Vayghan, M. A. Saied, M. Toeroe and F. Khendek, "Microservice Based Architecture: Towards High-Availability for Stateful Applications with Kubernetes," 2019 IEEE 19th International Conference on Software Quality, Reliability and Security (QRS), 2019, pp. 176-185, doi: 10.1109/QRS.2019.00034.*
Kubernetes Documentation, <https://v1-21.docs.kubernetes.io/docs/concepts/>, "Scheduling, Preemption, and Eviction" "Cluster Architecture", "Workloads", Jul. 20, 2021.*
Kubernetes Documentation, <https://v1-21.docs.kubernetes.io/docs/concepts/>, "Scheduling, Preemption, and Eviction" "Cluster Architecture", "Workloads", Apr. 16, 2021.*

* cited by examiner

*Primary Examiner* — Matthew M Kim
*Assistant Examiner* — Kyle Emanuele

(57) ABSTRACT

Container orchestration platforms, such as Kubernetes, automatically manage the execution of applications in containers on host computing systems. An application may include component applications that execute in different containers and a container orchestration platform may organize the containers for those component applications into a pod for the application. To spread the load for the application, the container orchestration platform may enable creation of more than one pod for a single application. Once created, any of the multiple pods may be selected to handle a request to the application. As such, all of the pods are considered active by the container orchestration platform.

20 Claims, 7 Drawing Sheets

ACTIVE-STANDBY PODS IN A CONTAINER ORCHESTRATION ENVIRONMENT

TECHNICAL BACKGROUND

Container orchestration platforms, such as Kubernetes, automatically manage the execution of applications in containers on host computing systems. An application may include component applications that execute in different containers and a container orchestration platform may organize the containers for those component applications into a pod for the application. To spread the load for the application, the container orchestration platform may enable creation of more than one pod for a single application. Once created, any of the multiple pods may be selected to handle a request to the application. As such, all of the pods are considered active by the container orchestration platform.

SUMMARY

The technology disclosed herein enables the creation and management of active and standby pods in a container orchestration environment. In a particular embodiment, a method includes identifying creation of pods for executing an application in a computing cluster, wherein a control plane creates the pods and providing an active-pod label to the control plane. The control plane updates pod-selection criteria with the active-pod label and the pod-selection criteria is used by a service executing in the computing cluster to select one or more of the pods to receive requests for the application. The method further includes instructing the control plane to add the active-pod label to a first pod of the pods. The service selects the first pod to handle a request for the application based on the pod-selection criteria after the active-pod label is added to the first pod.

In some embodiments, the method includes identifying a failure of the first pod and, in response to the failure, instructing the control plane to add the active-pod label to a second pod of the pods. The service selects the second pod to handle a second request for the application based on the pod-selection criteria after the active-pod label is added to the second pod. In those embodiments, in response to the failure, the method may include instructing the control plane to remove the active-pod label from the first pod. Also, in those embodiments, the second pod may be selected from a queue of the pods that are not active and, after instructing the control plane to remove the active-pod label, the method may include determining that the first pod is ready. In response to determining that the first pod is ready, the method of those embodiments may include adding the first pod to the queue.

In some embodiments, identifying the creation of the pods includes identifying the pods as having an active-standby label. The active-standby label is a label included in the pod by the control plane. In those embodiments, the method may include registering the pods in response to identifying the pods as having the active-standby label. The method may further include adding the pods to a queue of the pods that are not active and selecting the first pod from the queue. In those embodiments, the active-standby label may be included in service parameters for the application received by the control plane from a user and the service parameters may also include a strategy label defining a number of active pods and a number of standby pods for the application.

In some embodiments, the method includes randomly generating the active-pod label.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to identify creation of pods for executing an application in a computing cluster. A control plane creates the pods. The program instructions further direct the processing system to provide an active-pod label to the control plane. The control plane updates pod-selection criteria with the active-pod label and the pod-selection criteria is used by a service executing in the computing cluster to select one or more of the pods to receive requests for the application. The program instructions also direct the processing system to instruct the control plane to add the active-pod label to a first pod of the pods. The service selects the first pod to handle a request for the application based on the pod-selection criteria after the active-pod label is added to the first pod.

DETAILED DESCRIPTION

The active-standby controller described herein enables one or more pods for an application in a container orchestration environment to effectively be kept in a standby state. Even if standby pods are otherwise functionally identical those pods for the application that are active, the active-standby controller configures a container orchestration platform that handles the container orchestration environment such that the standby pods are not selected to handle requests to the application. Should one of the standby pods be needed (e.g., an active pod fails, or additional capacity is needed for the application), then the active-standby controller configures the container orchestration environment to enable one or more of the formerly standby pods to be selected for handling application requests. Using the active-standby controller to implement active and standby pods for an application enables active-standby load balancing for the pods while avoiding a need to incorporate load balancing components, such as Apache ZooKeeper, directly into the application.

Figure 1:
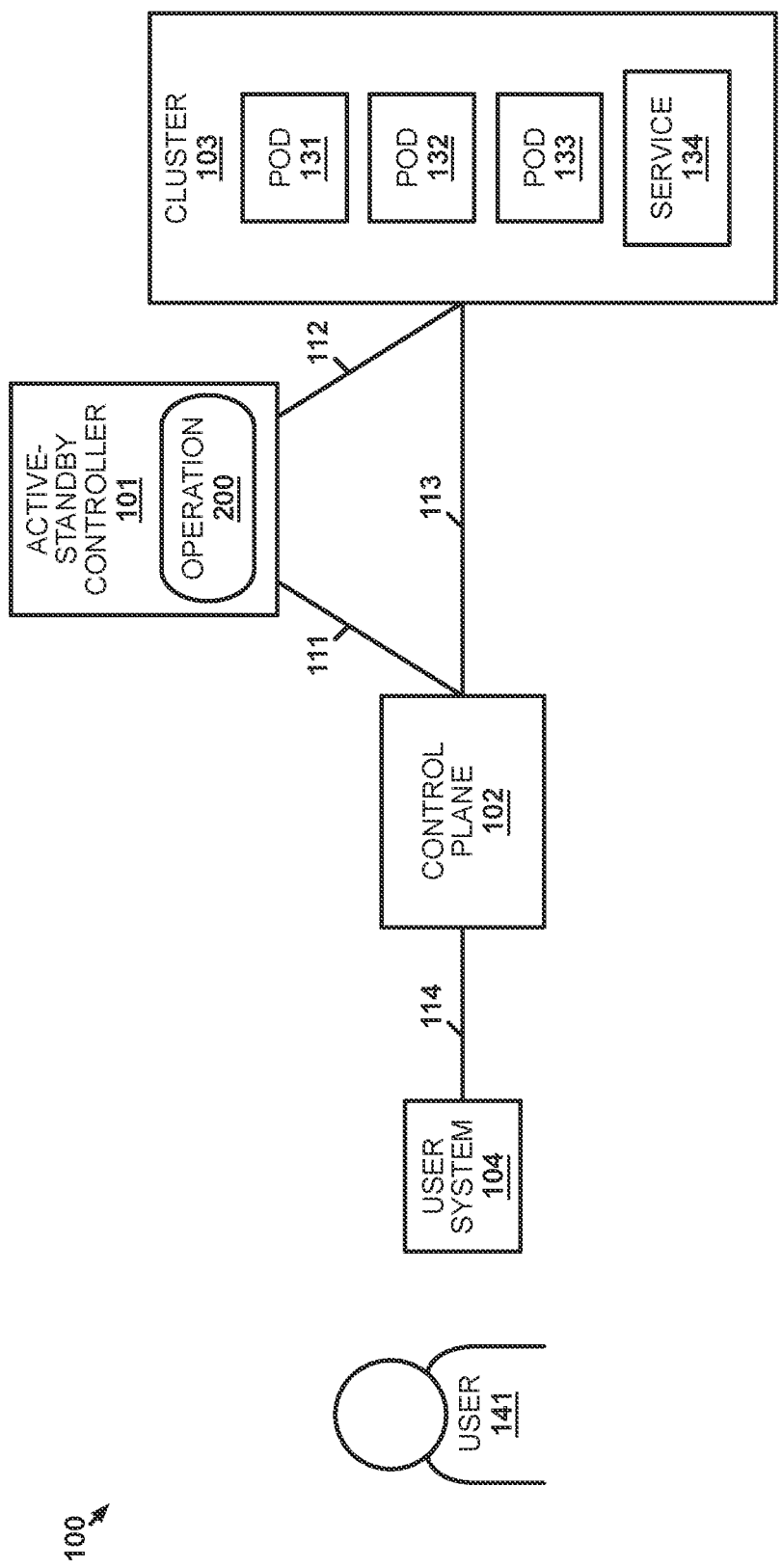
FIG. 1 illustrates an implementation for creating and managing active and standby pods in a container orchestration environment.

FIG. 1 illustrates implementation 100 for creating and managing active and standby pods in a container orchestration environment. Implementation 100 includes active-standby controller 101, control plane 102, cluster 103, and user system 104. Active-standby controller 101 and control plane 102 communicate over logical communication link 111. Active-standby controller 101 and cluster 103 communicate over logical communication link 112. Control plane 102 and cluster 103 communicate over logical communication link 113. User system 104 and control plane 102 communicate over logical communication link 114. Logical communication links 111-114 may be overlay links that carry communications over wired and/or wireless physical communication links, which may be direct links but may include intervening systems, networks, and/or devices, and/ or may include software implemented links between components executing on the same host computing system. Cluster 103 may include one or more physical host computing systems for executing containers, virtual machines, and/or some other type of virtualized computing element. As such, logical communication links 112 and 113 may comprise more than one logical link to respective physical or virtualized computing systems in cluster 103. User system 104 may be a telephone, laptop, personal computer, tablet computer, or some other type of user operable computing system.

In operation, control plane 102 executes on a computing system to manage workloads and communications across cluster 103. In some examples, control plane 102 may itself be a virtualized element executing on a host computing system in cluster 103 (e.g., as a container or a virtual machine) but may also be executing (virtualized or not) on a physical computing system outside of cluster 103. When control plane 102 is instructed (e.g., by user 141 via user system 104 or otherwise) to initiate execution of an application, control plane 102 instantiates one or more pods for the application within cluster 103. Each pod includes one or more containerized components of the application. A containerized component is a component of the application that executes in a container on a physical host computing system, which is sometimes referred to as a node. Each node executes a container runtime environment that enables the node to host one or more containers. In some examples, all containers in a pod may be required to execute on the same node, although, a single node may host more than one pod. Executing all containerized components in a pod on the same node allows for information to be passed/shared between the components without traveling outside of the node.

Typically, any one of the pods created in cluster 103 for the application may be selected to handle an incoming request for the application. A common pods selection method is round-robin, although other manners of selection may be used (e.g., random selection). For example, if the application is a web server for a website, then the request may be for a user system to be provided with a page of the website and the request may be handled by whichever pod is next in line during round-robin selection. In contrast, active-standby controller 101 executes on a computing system to perform operation 200, which configures the container orchestration environment (e.g., control plane 102, cluster 103, and possibly active-standby controller 101 itself in this case) to enable at least one of the pods for an application to be on standby and not subject to selection for handling incoming requests. In some examples, active-standby controller 101 may itself be a virtualized element executing on a host computing system in cluster 103 (e.g., as a container or a virtual machine) but may also be executing (virtualized or not) on a physical computing system outside of cluster 103. The container orchestration environment discussed herein may be a Kubernetes environment or may be another type of container orchestration environment that uses a pod management mechanism similar thereto.

Figure 2:
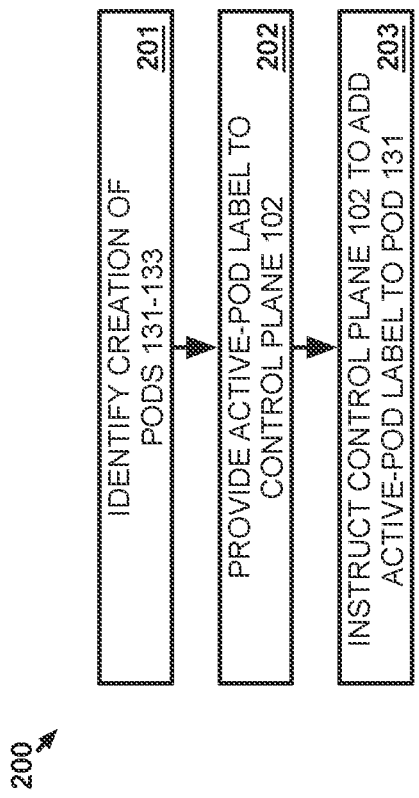
FIG. 2 illustrates an operation to create and manage active and standby pods in a container orchestration environment.

FIG. 2 illustrates operation 200 to create and manage active and standby pods in a container orchestration environment. In operation 200, active-standby controller 101 identifies creation of pods 131-133, by control plane 102, for executing an application in cluster 103 (201). User system 104 may provide an instruction to control plane 102 that directs control plane 102 to create pods 131-133 or some other event may be the impetus for control plane 102 to create pods 131-133. Active-standby controller 101 may monitor cluster 103 for pods being created to identify that pods 131-133 were created, may intercept communications between control plane 102 and cluster 103 that indicate pods 131-133 have been created, may be notified by control plane 102 that pods 131-133 have been created, or may determine that pods 131-133 have been created in some other manner. When identifying that pods 131-133 have been created, active-standby controller 101 identifies that pods 131-133 are associated with the application (e.g., the containerized component applications in each pod are components of the application). That allows active-standby controller 101 to differentiate between pods for different applications (e.g., pods for other applications may also be executing in cluster 103).

In some examples, each of pods 131-133 will include a label, or other type of indicator, that indicates the pods' association with the application and that label is read by active-standby controller 101 or active-standby controller 101 may be notified of the application associated with each pod in some other manner. Labels are keys (e.g., string of characters or other data) that can be assigned to objects, such as pods or nodes, in the container orchestration environment by control plane 102. Queries, sometimes called label selectors, can be performed on the labels to resolve objects matching the query (e.g., a search query can be performed to find all pods having a particular application's label).

Also, pods 131-133 may include a label, or some other type of indication, that notifies active-standby controller 101 that pods 131-133 are to be operated in an active-standby strategy. The label, or other indication, may further notify active-standby controller 101 about the number of pods that should be active and the number of pods that should be standby. For instance, since there are three pods in the present example, the label may indicate two active pods and one standby pod or one active pod and two standby pods. In other examples, active-standby controller 101 may be pre-configured to use an active-standby strategy for pods of all applications, of only certain predefined applications, or may determine when to use the active-standby strategy in some other manner. In those examples, active-standby controller 101 may also determine the ratio of active to standby pods (e.g., two active, one standby from the above example) by using a default ratio for all applications, a ratio for certain predefined applications (which may be different for different applications), or may determine the ratio in some other manner.

Active-standby controller 101 also provides an active-pod label to control plane 102 (202). The active-pod label is a label that will be used in the container orchestration environment to indicate when a pod is available to handle queries (i.e., is active from the perspective of the active-standby controller 101). The active-pod label may be unique for use among pods 131-133 or may be different for pods of different applications in cluster 103 that are also using an active-standby strategy controlled by active-standby controller 101. In some examples, the active-pod label may be randomly generated, pre-determined, set by a user, or defined in some other manner. The active-pod label may be created after (e.g., in response to) creation of one or more of pods 131-133 or at some other time.

Upon being provided with the active-pod label, control plane 102 updates pod-selection criteria with the active-pod label. The pod-selection criteria is used by service 134 executing in cluster 103 to select one or more of pods 131-133 to receive requests for the application (i.e., to be active). Control plane 102 may update the pod-selection criteria locally and then send the updated pod-selection criteria to service 134 or may direct service 134 to update the pod-selection criteria. The pod-selection criteria effectively instructs service 134 to only select a pod from pods having the active-pod label. Pods that do not have the active-pod label are not selected, as they are considered to be standby pods by active-standby controller 101. Service 134 is an object in the container orchestration environment created by control plane 102 as an abstraction that defines the logical set of pods 131-133 and how to access pods 131-133. When a request for the application is incoming, the request is directed towards service 134 and service 134 selects one of pods 131-133 to handle the request. In this case, service 134 selects one of pods 131-133 having the active-pod label in accordance with the pod-selection criteria (e.g., searches for pods having the active-pod label and selects one of those pods). While the application discussed in this example includes only one service using pods 131-133, other examples may include multiple services and associated pods that handle other aspects of a single application. In those examples, a request for the application may be received from one of those other services.

Active-standby controller 101 further instructs control plane 102 to add the active-pod label to one of pods 131-133 (203). In this example, control plane 102 adds the active-pod label to pod 131. Pod 131 is the one of pods 131-133 that active-standby controller 101 selected to be active. Pod 131 may be selected at random from ones of pods 131-133 that are on standby (e.g., from pods that are ready to handle requests but are not yet active), may be selected from a queue of pods 131-133 that are on standby (e.g., using first in first out), or may be selected using some other logic. In some examples, active-standby controller 101 may determine more than one pod of pods 131-133 should be active and instruct control plane 102 to add the active-pod label to more than one pod (e.g., the strategy indicates that two of the three pods be active). After the active-pod label is added pod 131, service 134 selects pod 131 to handle a request for the application based on the pod-selection criteria. That is, when service 134 receives a request for the application that is to be handled by one of pods 131-133, the pod-selection criteria indicates to service 134 that a pod having the active-pod label should be selected. Since pod 131 has the active-pod label, service 134 is allowed by pod-selection criteria to select pod 131 and send the request to pod 131 accordingly. If more than one of pods 131-133 have the active-pod label, then service 134 may select pod 131 from the pods that have the active-pod label (e.g., pod 131 may be selected because pod 131 is next in line during service 134's round-robin selection method). To identify the ones of pods 131-133 that include the active-pod label, service 134 may perform a search query on pods 131-133 for pods having the active-pod label.

Advantageously, while control plane 102 and service 134 do not themselves track pods that are active and pods that are on standby for an application, the labelling of active pods at the direction of active-standby controller 101 effectively prevents service 134 from selecting pods that active-standby controller 101 considers to be on standby (i.e., those pods that were not selected to include the active-pod label). In some examples, should active-standby controller 101 determine that a pod should become a standby pod, active-standby controller 101 may instruct control plane 102 to remove the active-pod label from that pod. With the pod no longer having the active-pod label, service 134 will no longer select the pod for handling requests in accordance with the pod-selection criteria.

Figure 3:
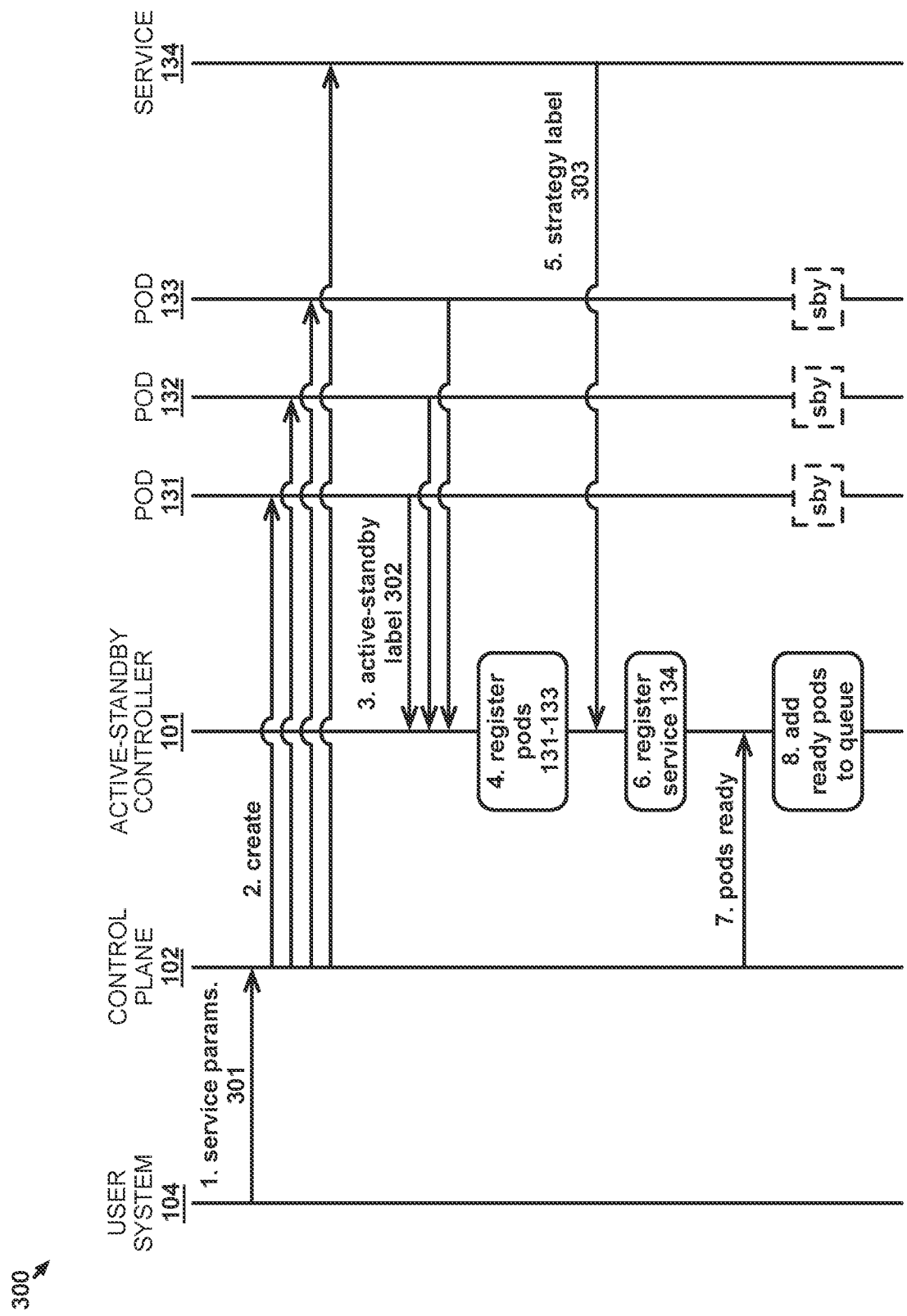
FIG. 3 illustrates an operational scenario for creating and managing active and standby pods in a container orchestration environment.

FIG. 3 illustrates operational scenario 300 for creating and managing active and standby pods in a container orchestration environment. Operational scenario 300 is an example of how active-standby controller 101 handles the active and standby status of pods 131-133. Control plane 102 receives service parameters 301 at step 1 from user system 104. The service parameters may have been provided via input from user 141 into user system 104. Service parameters 301 are associated with an application that will execute in cluster 103 and may identify the application therein (e.g., using a label) or may associate themselves with the application in some other manner. Executable instructions for the application (e.g., software for execution in containers that make up the pods) may also be received from user system 104 or the instructions may be received from some other source (e.g., an application storage repository). Service parameters 301 include active-standby label 302 that control plane 102 will add to pods 131-133 when creating pods 131-133. A pod having active-standby label 302 indicates to active-standby controller 101 that the pod should be used in an active-standby strategy. Service parameters 301 also include strategy label 303 that control plane 102 will add to service 134 indicating an active-standby strategy to use for the pod deployment. Strategy label 303 indicates a number of active pods and a number of standby pods that should be implemented. In this example, one active pod and two standby pods will be used. Both active-standby label 302 and strategy label 303 follow a convention known to active-standby controller 101 so that active-standby controller 101 can formulate label queries that enable active-standby controller 101 to identify pods 131-133 and service 134 when created in cluster 103. For example, labels may be required to start with "activestandbyctrl". Active-standby controller 101, therefore, simply need to search cluster 103 for pods and services with labels starting with "activestandbyctrl". In that example, active-standby label 302 may be "activestandbyctrl-pod:true" and strategy label 303 may be "activestandbyctrl-strategy:active=1,standby=2".

Upon receiving service parameters 301, at step 2, control plane 102 creates pods 131-133 and service 134. When creating pods 131-133, control plane 102 adds active-standby label 302 thereto and, when creating service 134, control plane 102 adds strategy label 303 thereto. Upon recognizing that pods 131-133 each include active-standby label 302 at step 3 (e.g., through a label search query described above), active-standby controller 101 registers pods 131-133 at step 4 in preparation for pods 131-133 to be used in an active-standby strategy. The registration associates the newly created pods with the application in active-standby controller 101. Upon recognizing that service 134 includes strategy label 303 at step 5 (e.g., through the label search query), service 134 registers service 134 in association with pods 131-133 in preparation for service 134 to be used in the active-standby strategy. Since strategy label 303 further indicates that one active and two standby pods should be used in the strategy, active-standby controller 101 is now informed about how many of pods 131-133 should be active at a time. It should be understood that, while pods 131-133 and service 134 are shown to be created at the same time, each element may be created at staggered times. Also, rather than identifying all of pods 131-133 at once, active-standby controller 101 may identify and register each pod as others are still being created. Similarly, service 134 may be created, identified, and registered in a different order than that shown (e.g., may be created, identified, and/or registered after pod 132 but before service 134).

While pods 131-133 have been identified by active-standby controller 101, they are not necessarily ready to handle requests until control plane 102 marks them as ready at step 7. Although, operational scenario 300 shows control plane 102 directly notifying active-standby controller 101 that pods 131-133 are ready, active-standby controller 101 recognizes that pods 131-133 are ready when control plane 102 marks them as so. As ones of pods 131-133 become ready, active-standby controller 101, at step 8, adds them to a queue of standby pods that can be activated when active-standby controller 101 determines an active pod is needed. While operational scenario 300 shows all of pods 131-133 being on standby after step 8, it is possible that only one or two of pods 131-133 are ready in the queue prior to continuing on to operational scenario 400. In those cases, the remaining pod(s) will be added to the queue when control plane 102 indicates they are ready.

Figure 4:
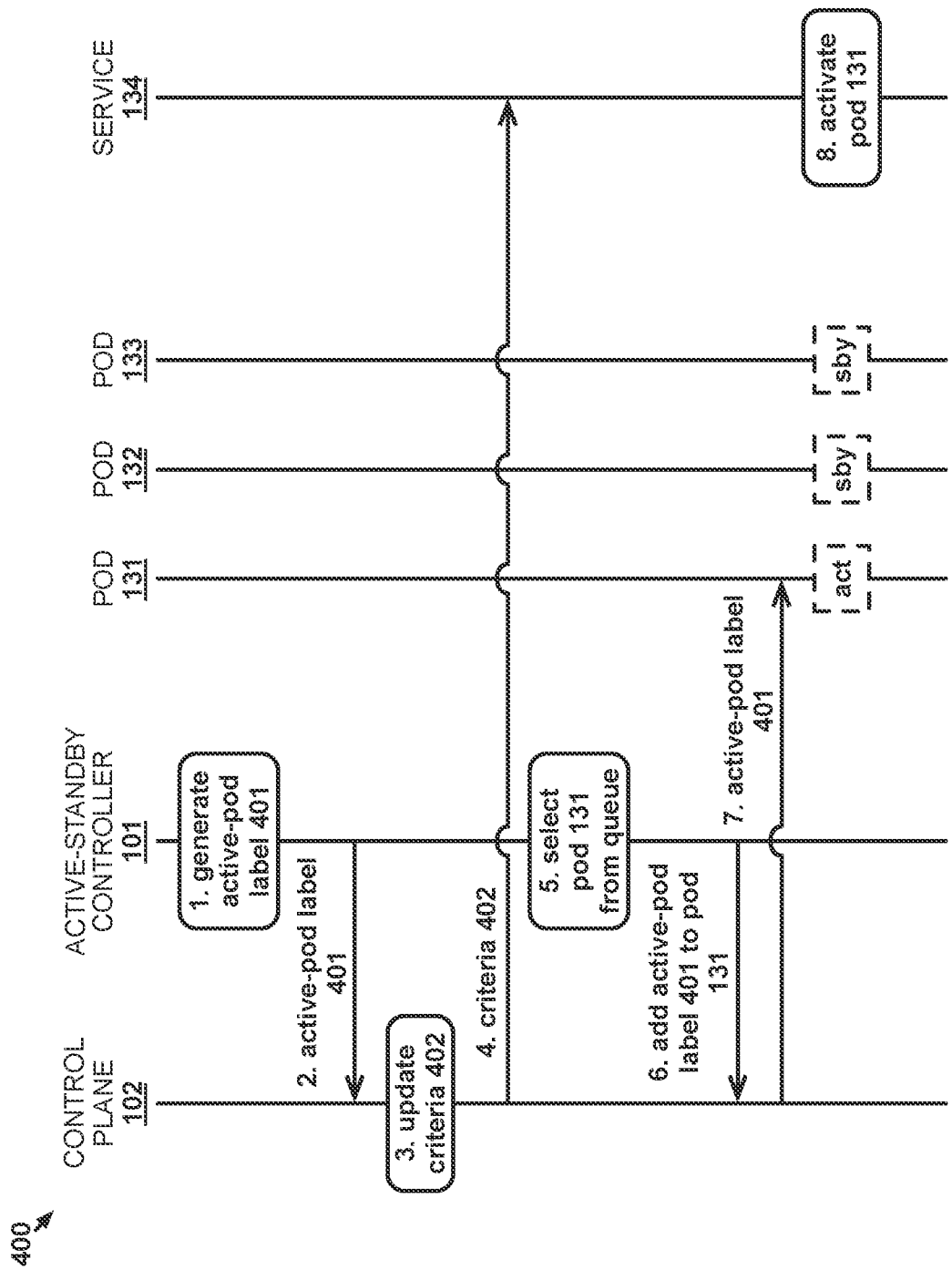
FIG. 4 illustrates an operational scenario for creating and managing active and standby pods in a container orchestration environment.

FIG. 4 illustrates operational scenario 400 for creating and managing active and standby pods in a container orchestration environment. Operational scenario 400 occurs after operational scenario 300, although, in some cases, steps 1-4 operational scenario 400 may begin before any of pods 131-133 are ready so that service 134 does not select one of pods 131-133 for handling a request prior to the active-standby strategy being implemented. In operational scenario 400, active-standby controller 101 randomly generates active-pod label 401 at step 1. Active-pod label 401 can be any label that is not already used in the container orchestration environment and, preferably, is a label that is not likely to be used for some other purpose. Active-pod label 401 does not need to follow the same convention as active-standby label 302 and strategy label 303. Active-standby controller 101 provides active-pod label 401 to control plane 102 at step 2 and directs control plane 102 to update pod-selection criteria 402. Pod-selection criteria 402 updates pod-selection criteria 402 at step 3 to indicate that only pods having active-pod label 401 should be selected by service 134 to service requests for the application of pods 131-133. Control plane 102 provides pod-selection criteria 402 to service 134 at step 4 so that service 134 can begin pod selection based on pod-selection criteria 402. Since no pod has yet received active-pod label 401, service 134 is unable to select a pod even when one or more of pods 131-133 become ready.

Active-standby controller 101 selects pod 131 to become active at step 5. Pod 131 may be selected because pod 131 is the only pod presently in the queue, because pod 131 is the pod that has been in the queue the longest, because pod 131 was randomly selected, or pod 131 may be selected from the queue in some other manner. After selecting pod 131, active-standby controller 101 directs control plane 102 at step 6 to add active-pod label 401 to pod 131. In response to that direction control plane 102 adds active-pod label 401 to pod 131 at step 7, which activates pod 131 for selection by service 134 at step 8. Since pod-selection criteria 402 prevents service 134 from selecting pods that do not have active-pod label 401, when service 134 receives an application request, service 134 searches the labels of pods 131-133 to determine which of pods 131-133, if any, have active-pod label 401. In this case, since pod 131 now has active-pod label 401, service 134 finds pod 131 and directs the request thereto. Pod 132 and pod 133 both lack active-pod label 401 (i.e., are effectively on standby) and, therefore, are not able to be selected by service 134.

Figure 5:
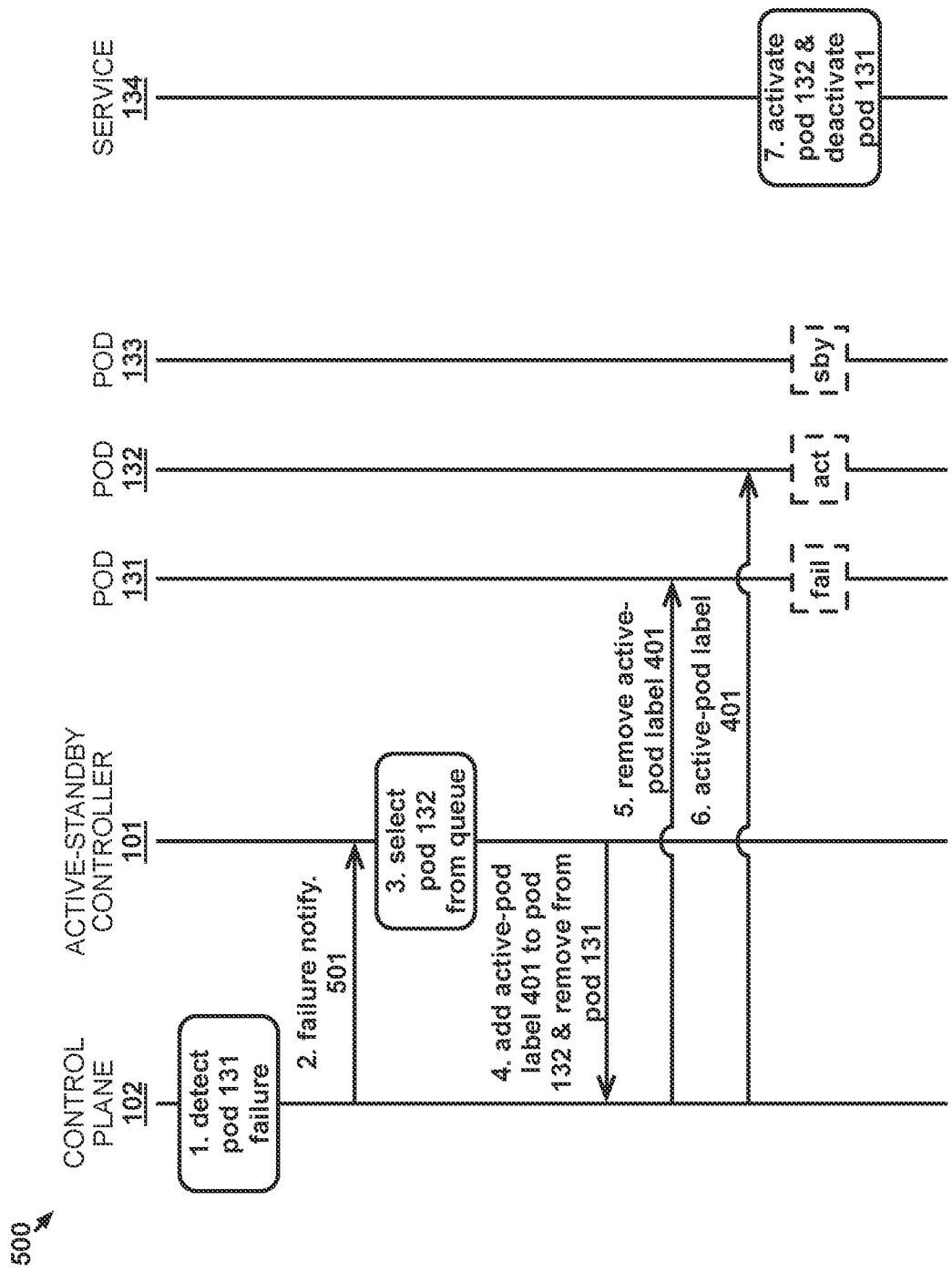
FIG. 5 illustrates an operational scenario for creating and managing active and standby pods in a container orchestration environment.

FIG. 5 illustrates operational scenario 500 for creating and managing active and standby pods in a container orchestration environment. Operational scenario 500 is an example of how active-standby controller 101 handles a failure of an active pod after pod 131 was activated during operational scenario 400. In operational scenario 500, control plane 102 detects the failure of pod 131 at step 1. Control plane 102 may periodically transmit probe messages to pod 131 (and possibly other ready pods) to determine whether pod 131 is still ready. When control plane 102 does not receive a response to one of the probe messages, then control plane 102 may assume that pod 131 has failed. Other manners of determining pod failure may also be used. Upon detecting the failure, active-standby controller 101 receives failure notification 501 at step 2. While failure notification 501 is shown as coming from control plane 102, control plane 102 may simply mark pod 131 as not being ready (or no longer marked as being ready) and failure notification 501 may constitute active-standby controller 101 recognizing that pod 131 is not ready.

Fortunately, there are two standby pods, pod 132 and pod 133, in the queue maintained by active-standby controller 101 that are ready to take over for pod 131. In response to receiving failure notification 501, active-standby controller 101 selects pod 132 from the queue at step 3. Pod 132 may be selected over pod 133 based on pod 132 being in the queue longer, at random, or based on some other selection logic. Active-standby controller 101, at step 4, directs control plane 102 to add active-pod label 401 to pod 132 and to remove active-pod label 401 from pod 131. In response to the direction from active-standby controller 101, control plane 102 removes active-pod label 401 from pod 131 at step 5 and adds active-pod label 401 to pod 132 at step 6. The above label changes, deactivate pod 131 and activate pod 132 for selection by service 134 at step 7. When a request for the application is received by service 134, service 134 will select pod 132 to handle the request based on pod-selection criteria 402 because pod 132 now has active-pod label 401. Pod 133 remains on standby and pod 131 is in a failed state and, therefore, is not active nor on standby.

Figure 6:
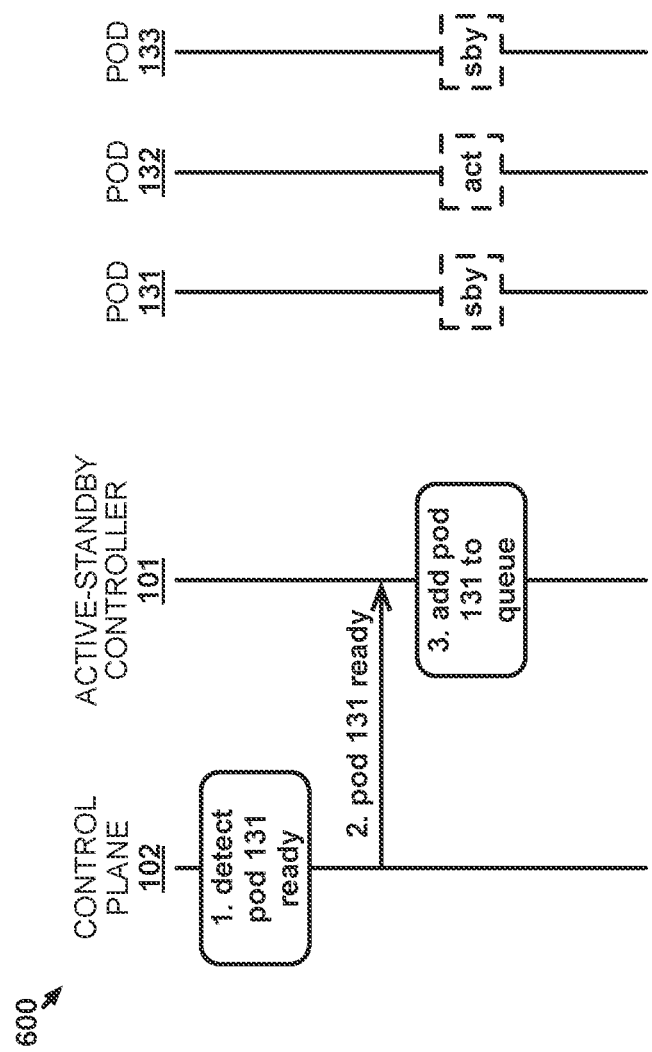
FIG. 6 illustrates an operational scenario for creating and managing active and standby pods in a container orchestration environment.

FIG. 6 illustrates operational scenario 600 for creating and managing active and standby pods in a container orchestration environment. Operational scenario 600 occurs after pod 131 failed in operational scenario 500. In operational scenario 600, control plane 102 detects that pod 131 is again ready at step 1 and notifies active-standby controller 101 that pod 131 is ready at step 2. As was the case in operational scenario 300, control plane 102 may notify active-standby controller 101 by simply marking pod 131 as ready in the container orchestration environment rather than explicitly messaging active-standby controller 101 with a notification. Upon being notified the pod 131 is ready, active-standby controller 101 adds pod 131 to the standby queue at step 3. Once in the standby queue, pod 131 can then be reactivated should pod 132 fail and pod 131 is selected from the queue over pod 133.

Advantageously, in the above scenarios, modification of control plane 102 is not necessary since active-standby controller 101 is able to implement the active-standby strategy by manipulating object labelling and pod selection mechanisms already provided by the container orchestration platform.

Figure 7:
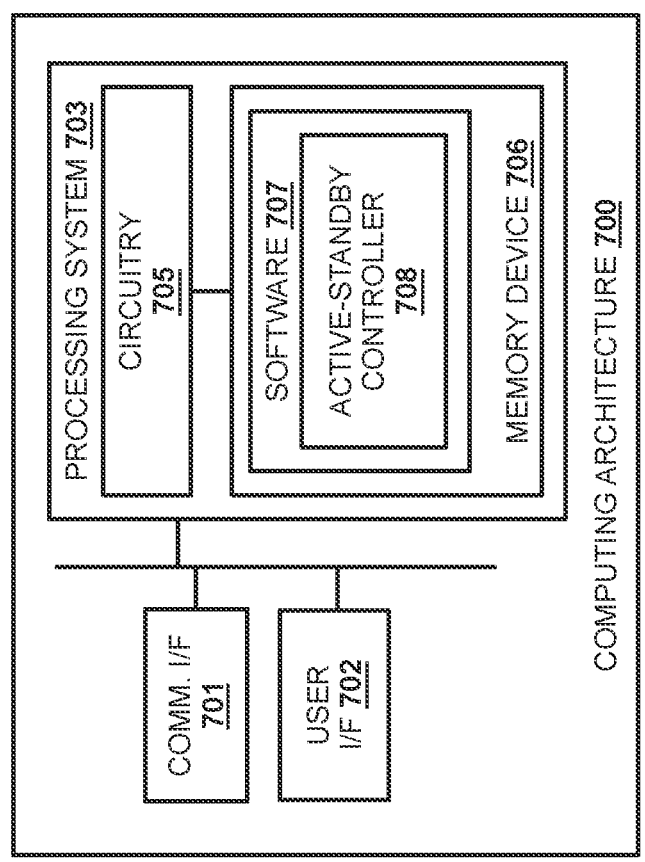
FIG. 7 illustrates a computing architecture for creating and managing active and standby pods in a container orchestration environment.

FIG. 7 illustrates computing architecture 700 for creating and managing active and standby pods in a container orchestration environment. Computing architecture 700 is an example computing architecture for active-standby controller 101, although active-standby controller 101 may use alternative configurations. Computing architecture 700 may also be used for computing systems in cluster 103, for control plane 102, and/or for user system 104. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a computer readable storage medium, such as a disk drive, flash drive, data storage circuitry, or some other memory apparatus. In no examples would a storage medium of memory device 706 be considered a propagated signal. Operating software 707 comprises computer programs, firmware, or some other form of machine-readable processing instructions. Operating software 707 includes active-standby controller module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, active-standby controller module 708 directs processing system 703 to identify creation of pods for executing an application in a computing cluster, wherein a control plane creates the pods. Active-standby controller module 708 further directed processing system 703 to provide an active-pod label to the control plane. The control plane updates pod-selection criteria with the active-pod label and the pod-selection criteria is used by a service executing in the computing cluster to select one or more of the pods to receive requests for the application. Active-standby controller module 708 also directs processing system 703 to instruct the control plane to add the active-pod label to a first pod of the pods. The service selects the first pod to handle a request for the application based on the pod-selection criteria after the active-pod label is added to the first pod.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
in an active-standby controller:
identifying creation of pods for executing an application in a computing cluster, wherein a control plane creates the pods;
providing an active-pod label to the control plane, wherein the control plane updates pod-selection criteria with the active-pod label, wherein the pod-selection criteria is used by a service executing in the computing cluster to select one or more of the pods to receive requests for the application; and
instructing the control plane to add the active-pod label to a first pod of the pods, wherein the service selects the first pod to handle a request for the application based on the pod-selection criteria after the active-pod label is added to the first pod.

2. The method of claim 1, comprising:
identifying a failure of the first pod;
in response to the failure, instructing the control plane to add the active-pod label to a second pod of the pods, wherein the service selects the second pod to handle a second request for the application based on the pod-selection criteria after the active-pod label is added to the second pod.

3. The method of claim 2, comprising:
in response to the failure, instructing the control plane to remove the active-pod label from the first pod.

4. The method of claim 3, wherein the second pod is selected from a queue of the pods that are not active, and the method comprising:
after instructing the control plane to remove the active-pod label, determining that the first pod is ready; and
in response to determining that the first pod is ready, adding the first pod to the queue.

5. The method of claim 1, wherein identifying the creation of the pods comprises:
identifying the pods as having an active-standby label, wherein the active-standby label is a label included in the pods by the control plane.

6. The method of claim 5, comprising:
registering the pods in response to identifying the pods as having the active-standby label.

7. The method of claim 6, comprising:
adding the pods to a queue of the pods that are not active; and
selecting the first pod from the queue.

8. The method of claim 5, wherein the active-standby label is included in service parameters for the application received by the control plane from a user.

9. The method of claim 8, wherein the service parameters further include a strategy label defining a number of active pods and a number of standby pods for the application, and the method comprising:
recognizing the service includes the strategy label; and
implementing the number of active pods and the number of standby pods, wherein the first pod is one pod of the number of active pods.

10. The method of claim 1, comprising:
generating random data to use as the active-pod label.

11. An apparatus comprising:
one or more computer readable storage media;
a processing system operatively coupled with the one or more computer readable storage media; and
program instructions stored on the one or more computer readable storage media that, when read and executed by the processing system, direct the processing system to:
in an active-standby controller:
identify creation of pods for executing an application in a computing cluster, wherein a control plane creates the pods;
provide an active-pod label to the control plane, wherein the control plane updates pod-selection criteria with the active-pod label, wherein the pod-selection criteria is used by a service executing in the computing cluster to select one or more of the pods to receive requests for the application; and
instruct the control plane to add the active-pod label to a first pod of the pods, wherein the service selects the first pod to handle a request for the application based on the pod-selection criteria after the active-pod label is added to the first pod.

12. The apparatus of claim 11, wherein the program instructions direct the processing system to:
identify a failure of the first pod;
in response to the failure, instruct the control plane to add the active-pod label to a second pod of the pods, wherein the service selects the second pod to handle a second request for the application based on the pod-selection criteria after the active-pod label is added to the second pod.

13. The apparatus of claim 12, wherein the program instructions direct the processing system to:
in response to the failure, instruct the control plane to remove the active-pod label from the first pod.

14. The apparatus of claim 13, wherein the second pod is selected from a queue of the pods that are not active, and wherein the program instructions direct the processing system to:
after instructing the control plane to remove the active-pod label, determine that the first pod is ready; and
in response to determining that the first pod is ready, add the first pod to the queue.

15. The apparatus of claim 11, wherein to identify the creation of the pods, the program instructions direct the processing system to:
identify the pods as having an active-standby label, wherein the active-standby label is a label included in the pods by the control plane.

16. The apparatus of claim 15, wherein the program instructions direct the processing system to:
register the pods in response to identifying the pods as having the active-standby label.

17. The apparatus of claim 16, wherein the program instructions direct the processing system to:
add the pods to a queue of the pods that are not active; and
select the first pod from the queue.

18. The apparatus of claim 15, wherein the active-standby label is included in service parameters for the application received by the control plane from a user.

19. The apparatus of claim 18, wherein the service parameters further include a strategy label defining a number of active pods and a number of standby pods for the application.

20. One or more non-transitory computer readable storage media having program instructions stored thereon that, when read and executed by a processing system, direct the processing system to: in an active-standby controller: identify creation of pods for executing an application in a computing cluster, wherein a control plane creates the pods; provide an active-pod label to the control plane, wherein the control plane updates pod-selection criteria with the active-pod label, wherein the pod-selection criteria is used by a service executing in the computing cluster to select one or more of the pods to receive requests for the application; and instruct the control plane to add the active-pod label to a first pod of the pods, wherein the service selects the first pod to handle a request for the application based on the pod-selection criteria after the active-pod label is added to the first pod.

* * * * *